United States Patent [19]

Daley

[11] 3,921,279
[45] Nov. 25, 1975

[54] METHOD FOR MAKING A SUPPORT FOR AN OBJECT

[76] Inventor: Thomas G. Daley, 9716 Lanesboro Way, Louisville, Ky. 40222

[22] Filed: Aug. 20, 1974

[21] Appl. No.: 498,962

[52] U.S. Cl. .................. 29/458; 206/320; 248/346; 264/46.6
[51] Int. Cl.² ...................... B23P 3/00; B23P 25/00
[58] Field of Search ................. 29/460, 458, 155 R; 264/46.6, 46.7; 248/19, 119 R, 346; 206/320

[56] References Cited
UNITED STATES PATENTS

| | | | |
|---|---|---|---|
| 2,910,730 | 11/1959 | Risch | 264/46.6 |
| 2,969,170 | 1/1961 | Waldorf | 206/230 UX |
| 3,007,208 | 11/1961 | Urban | 264/46.5 |
| 3,166,831 | 1/1965 | Keith | 29/155 R |
| 3,346,221 | 10/1967 | Farmer | 264/46.6 X |
| 3,498,626 | 3/1970 | Sullivan | 264/46.6 X |
| 3,567,068 | 3/1971 | Carfizzi | 248/346 X |
| 3,648,959 | 3/1972 | Wagner | 248/346 |
| 3,727,295 | 4/1973 | Gildemeister | 264/46.5 X |
| 3,773,875 | 11/1973 | Lammers | 264/46.6 X |

Primary Examiner—Charlie T. Moon

[57] ABSTRACT

A method for preparing and an apparatus for supporting appliances thereon, the support being a pair of base members with means on the top side thereof for mounting an appliance thereto. Each of the base members is comprised of a hollow member having disposed at preselected portions therein resilient foam materials which maintain the base members in a preselected configuration and support the appliance mounted thereto.

5 Claims, 4 Drawing Figures

U.S. Patent  Nov. 25, 1975  3,921,279
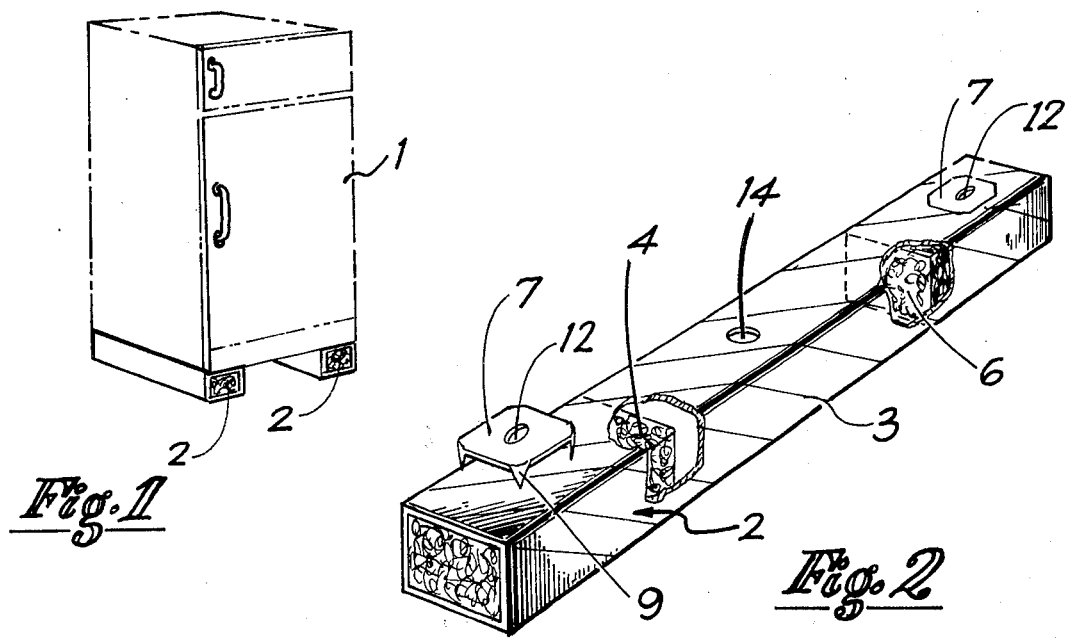
Fig.1
Fig.2
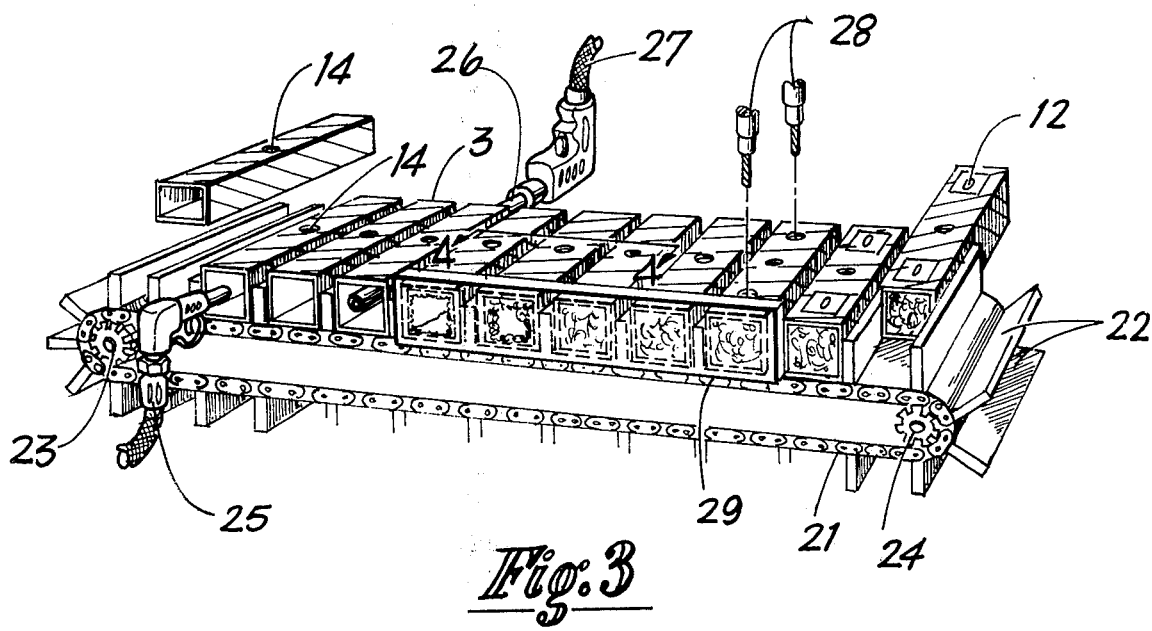
Fig.3
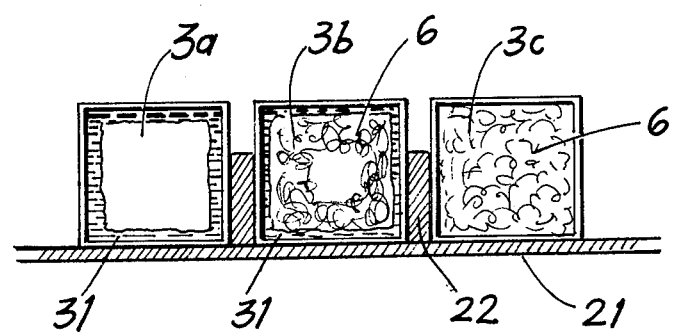
Fig.4

3,921,279

METHOD FOR MAKING A SUPPORT FOR AN OBJECT

BACKGROUND OF THE INVENTION

This invention relates to a method of preparing support runners for an appliance, and more particularly relates to an apparatus for supporting an appliance for shipment.

In the preparation of hardware type goods, such as major appliances, for shipment, it is an accepted practice to mount these goods onto runners or skids, the runners or skids absorbing shock and preventing damage to the goods during shipment. After the goods have reached their destination the support runners are usually removed from the major appliances and discarded. Presently, the most common support runners utilized in the shipment of major appliances are runners comprised of a pair of strips of wood with shock absorbing material, such as a resilient foam material, sandwiched therebetween, the runners being attached in parallel along opposing edges of the appliance. However, with the increasing cost of wood in the manufacture of these runners, it has been necessary to find a more economical means of support for these goods, but one that will withstand the shock and prevent damage in shipment from the manufacturing plant to the ultimate point of use.

SUMMARY OF THE INVENTION

In the present invention, it is recognized that it is desirable to provide an apparatus for supporting an object for shipment which is economical to manufacture. It is further recognized that it is desirable to provide an apparatus for supporting an object for shipment which is equal or superior to the supports presently available commercially.

The present invention advantageously provides a straightforward arrangement for a shipping support for an object. The present invention further provides a method for manufacturing shipping supports for objects. The present invention even further provides for a support for an object for shipping which is economical to manufacture in comparison with presently available shipping supports for hardware type goods and yet has improved support characteristics.

Various other features of the present invention will become obvious to those skilled in the art upon reading the disclosure set forth hereinafter.

More particularly, the present invention provides a method for making a support for objects comprising the steps of: preparing a hollow member for addition of a resilient foam mix therein; feeding a resilient foam mix into preselected portions of said hollow member; curing said resilient foam mix to form a resilient foam support within said selected portions of said hollow member; and, securing object mounting means at selected points along the top outer surface of said hollow member for mounting an object thereto.

Even more particularly, the present invention provides a support for an object comprising: at least one conduit base member with means on the top side thereof for mounting an object thereon; said conduit member having disposed at preselected portions therein resilient foam material, said resilient foam material being affixed to the inner surface of said conduit member and serving to maintain said conduit member in a preselected configuration when said object is mounted onto said conduit member.

It is to be understood that the description of the examples of the present invention given hereinafter are not by way of limitation. Various modifications within the scope of the present invention will occur to those skilled in the art upon reading the disclosure set forth hereinafter.

Referring to the drawings:

FIG. 1 is a perspective view illustrating a preferred object support of the present invention with an object mounted thereto;

FIG. 2 is a perspective view, partially cut away, of an object support member of the present invention;

FIG. 3 is a diagrammatic representation of one preferred apparatus for manufacturing an object support of the present invention; and, FIG. 4 is a sectional view taken along line 4—4 of FIG. 3.

In FIG. 1 of the drawing an object, such as a refrigerator 1, is shown mounted onto a pair of supports 2 of the present invention.

In FIG. 2 the support 2 shown in FIG. 1 is illustrated with selected portions cut away. The support 2 of the present invention includes a hollow member 3 which is exemplified by a spiral wound forty pound semichemical recycled container board of rectangular configuration. The rectangular shaped member 3 is generally convolute wound. At substantially each end of the spiral wound tube 2 is a preselected resilient foam portion identifiable by numerals 4 and 6, one preferred resilient foam being a polyurethane. The resilient foam portions are provided to support the hardware type goods, such as refrigerator 1, and maintain the spiral member in a preselected geometric configuration with the refrigerator 1 being mounted thereto. The amount of resilient foam material which is included within the hollow member depends upon the physical characteristics of the foam and the load to which it will be subjected.

It is realized that the hollow member 3 may be of geometric configurations other than rectangular. For example, some applications, such as an appliance corner post, may require a hollow member of C-shaped or L-shaped cross section.

Provided along the top side of the member 3 is a pair of mounting plates 7, mounting plates 7 being included for receiving bottom mounting surfaces of the hardware which is to be supported. The mounting plates 7 are shown as being 0.025 inch steel with corners 9 bent at approximately 90° to the mounting surface and embedded into the member 3. Generally, the mounting plates 7 are in alignment with the resilient foam portions 4 and 6, respectively, with apertures 12 disposed therein for receiving fastening means (not shown) therethrough. The fastening means are generally mounted through selected apertures in the bottom mounting surface of the object which is to be mounted onto the support. As exemplified, the mounting plates are rectangular in shape, but it is realized that other configurations may also be utilized. Furthermore, it is even realized that for some applications mounting plates may not be necessary and the object to be supported may be mounted directly to the partially foam filled conduit member.

Generally, resilient foam portions 4 and 6 are disposed only at each end of the support member 2. However, in certain instances where the object to be mounted thereto is long, heavy, or protection against a relatively large degree of shock is necessary, additional preselected portions of the member 3 may include the resilient foam therein.

Also, embedding the mounting plates 7 into the top surface of the member 3 with the bent corners 9 is usually sufficient to maintain the mounting plates in place. However, in certain instances it may be necessary to adhesively secure the plates 7 to the member 3 by means of, for example, "hot melt" glue. Such glues or adhesives are well known in the art and it is only necessary that they form a strong bond between the underside of the plates 7 and the outer surface of the member 3.

Resilient foam portions 4 and 6 may be formed of any suitable resilient foamed material. A polyurethane foam is a preferred material since it has been found that it has the most desirable characteristics of foam materials presently available on the market. It is to be understood, of course, that other resilient foamed materials may be entirely suitable for use in the support depending upon the sensitivity of the object to be carried. Thus, for instance, foamed polyethylene and foam rubber may also be used.

In the securing of an object, such as a refrigerator 1, to the upper surface of the member 3, it is only necessary that the object or refrigerator 1 be secured to mounting plates 7 in some manner so the object will not shift in relation to mounting plates 7 when subjected to shock in shipment. As noted and discussed previously, apertures 12 are provided in the mounting plates for receiving bolts or other fastening means therethrough which is normally all that is necessary in order to hold an object in place for shipment.

FIG. 3 illustrates one preferred method for making an object support member of the present invention. In a preferred embodiment a conveyor 21 with a plurality of flights 22 thereon are provided for movement about a pair of rolls 23 and 24, one of said rolls, exemplified as roll 23, being an idler roll and the other of said rolls, exemplified as roll 24, being driven by a suitable motor driving means (not shown). The cross sectional area between the flights 22 corresponds substantially to the cross sectional area of the spirally wound hollow member 3 which is inserted therebetween. Furthermore, the length of the flights 22 are generally the same length as the spirally wound members 3.

In FIG. 4, a sectional view of members 3 after addition of the resilient foam mix, illustrates the foaming reaction as the members 3 move toward the discharge end of conveyor 21. Member 3a shows the member immediately after the addition of the spray mix 31 to the hollow member. Member 3b shows the member during the foaming reaction and member 3c shows the member after the foaming reaction is complete.

In the processing of a hollow member 3, the hollow member 3 is mounted between two flights 22 at the feed end of the conveyor. The hollow member 3 on the conveyor 21 moves to a position adjacent to pre-heat air gun 25, wherein gun 25 is inserted into the hollow member 3. Pre-heated compressed air is then forced into the member 3 whereby the temperature of the inner surface of member 3 is brought to a temperature sufficient to start the reaction of the foaming mix which is to be added later in the process. It is noted that when utilizing a polyurethane foam mix, the preheated compressed air is utilized to bring the temperature of the inner surface of member 3 to a temperature of at least 140°F. When the inner surface of the hollow member 3 has been brought to the reacting temperature, a foam filling probe 26 attached to a conduit 27 which is in fluid communication with the reactant mix (not shown) is inserted completely into the hollow member 3. The probe 26 is then removed and upon removal probe 26 is activated whereby the foam mix is sprayed around the inner surface of the hollow member 3 for a preselected period of time thereby covering a preselected portion of the member 3. As the foam filling probe 26 is then removed, the probe 26 at a selected position is de-activated whereby a selected portion of the central portion of the hollow member is not subjected to the foam spray mix thereby leaving a central portion of the member 3 hollow. As the probe 26 approaches the opposite end of the member 3, the probe 26 is again activated wherein the liquid foam solution coats a preselected portion of the inner surface of the member 3. The probe 26 usually stays activated until it is substantially adjacent to the edge of the member 3. The probe 26 is then removed and the hollow support member 3 continues along the conveyor 21 wherein the reaction mix cures thereby forming a solid foam portion at each end of the support 3.

It is noted that the hollow member includes an aperture 14 disposed substantially in the middle of the top of the member 3. The aperture 14 is necessary to allow for the evacuation of carbon dioxide or other by-product gases which evolve during and after the injection of the reaction mix.

As the supports 3 near the discharge end of the conveyor 21, a pair of drills 28 are provided to drill mounting holes 12 in the top surface of the member 3. Drills 28 may be operated pneumatically, electrically, or by any other known means. After drilling, mounting plates are added to the support members 3.

A saw (not shown) is generally provided at the discharge end of the conveyor to trim the edges of the support member 3 as it has been found that during the foaming reaction, the foam extends beyond the member 3. Furthermore, backing plates 29 are generally included to prevent overflow of foam out the ends of the member 3 during the foaming reaction.

It will be realized that various changes may be made to the specific embodiment shown and described without departing from the principles of the present invention.

What is claimed is:

1. A method for making a support for an object comprising the steps of: preparing a hollow member for addition of a resilient foam mix therein; adding said resilient foam mix into spaced preselected portions of said hollow member; curing said resin mix to form a resilient foam support within selected portions of said hollow member; and, adding object mounting means at selected points of the foam filled said preselected portions along the top outer surface of said hollow member.

2. The method of claim 1 wherein preparing of said hollow member includes heat treatment of said inner surface of said hollow member to a preselected temperature.

3. The method of claim 1, said resilient foam mix being a mixture wherein the resulting foam product is a polyurethane foam material.

4. The method of claim 3 wherein preparing of said hollow member for addition of a resilient foam mix includes heat treatment with hot compressed air to at least 140°F.

5. The method of claim 1 including the step of inserting an aperture into substantially the center of said hollow member before addition of said resilient foam mix thereto, said aperture being between said selected portions for addition of said resilient foam mix whereby gas evolving during said curing step escapes through said aperture.

* * * * *